(12) United States Patent
Adam et al.

(10) Patent No.: US 12,485,237 B2
(45) Date of Patent: Dec. 2, 2025

(54) ASSEMBLY FOR DISPENSING A FLUID PRODUCT

(71) Applicant: APTAR FRANCE SAS, Le Neubourg (FR)

(72) Inventors: Fabien Adam, Aviron (FR); Vincent Farroco, Envermeu (FR)

(73) Assignee: APTAR FRANCE SAS, Le Neubourg (FR)

( * ) Notice: Subject to any disclaimer, the term of this patent is extended or adjusted under 35 U.S.C. 154(b) by 990 days.

(21) Appl. No.: 17/627,876

(22) PCT Filed: Jul. 16, 2020

(86) PCT No.: PCT/FR2020/051281
§ 371 (c)(1),
(2) Date: Jan. 18, 2022

(87) PCT Pub. No.: WO2021/014076
PCT Pub. Date: Jan. 28, 2021

(65) Prior Publication Data
US 2022/0273892 A1  Sep. 1, 2022

(30) Foreign Application Priority Data
Jul. 19, 2019 (FR) ...................................... 1908249

(51) Int. Cl.
*A61M 15/08* (2006.01)

(52) U.S. Cl.
CPC ..... *A61M 15/08* (2013.01); *A61M 2205/3327* (2013.01); *A61M 2205/3584* (2013.01);
(Continued)

(58) Field of Classification Search
CPC .......... A61M 15/08; A61M 2205/3327; A61M 2205/3584; A61M 2205/502;
(Continued)

(56) References Cited

U.S. PATENT DOCUMENTS

| 11,433,063 B1* | 9/2022 | Bleske ................. A61M 11/007 |
| 2016/0058960 A1* | 3/2016 | Papania ............ A61M 15/0028 |
| | | 128/200.22 |

(Continued)

FOREIGN PATENT DOCUMENTS

| WO | 98/57690 A1 | 12/1998 |
| WO | 02/085282 A1 | 10/2002 |
| WO | 2014/165694 A2 | 10/2014 |

OTHER PUBLICATIONS

International Preliminary Report on Patentability with the translation of Written Opinion dated Jan. 25, 2022 from the International Bureau in International Application No. PCT/FR2020/051281.
(Continued)

*Primary Examiner* — Bhisma Mehta
*Assistant Examiner* — Lei Gonzalez
(74) *Attorney, Agent, or Firm* — Sughrue Mion, PLLC

(57) ABSTRACT

Assembly for dispensing a fluid product, having a nasal fluid product dispenser with a reservoir containing the fluid, a dispensing member, and a dispensing head on the dispensing member, the dispensing head provided with a dispensing orifice, a remote mobile device attached to the user's head, such as an earpiece, the nasal device and the remote mobile device attached to the user's head each having an orientation sensor, such as an accelerometer or a gyroscope. The orientation sensors cooperate to determine the position of the nasal dispenser in the nostril. The nasal dispenser has an indicator visible when the dispenser is in the nostril, to guide the user towards an optimal orientation of the nasal dispenser in the nostril. The nasal dispenser having an electronic module and automatic actuation mechanism that automatically actuates the nasal device when the orientation sensors detect that the nasal dispenser is arranged in an optimal position.

21 Claims, 4 Drawing Sheets

Figure 1:
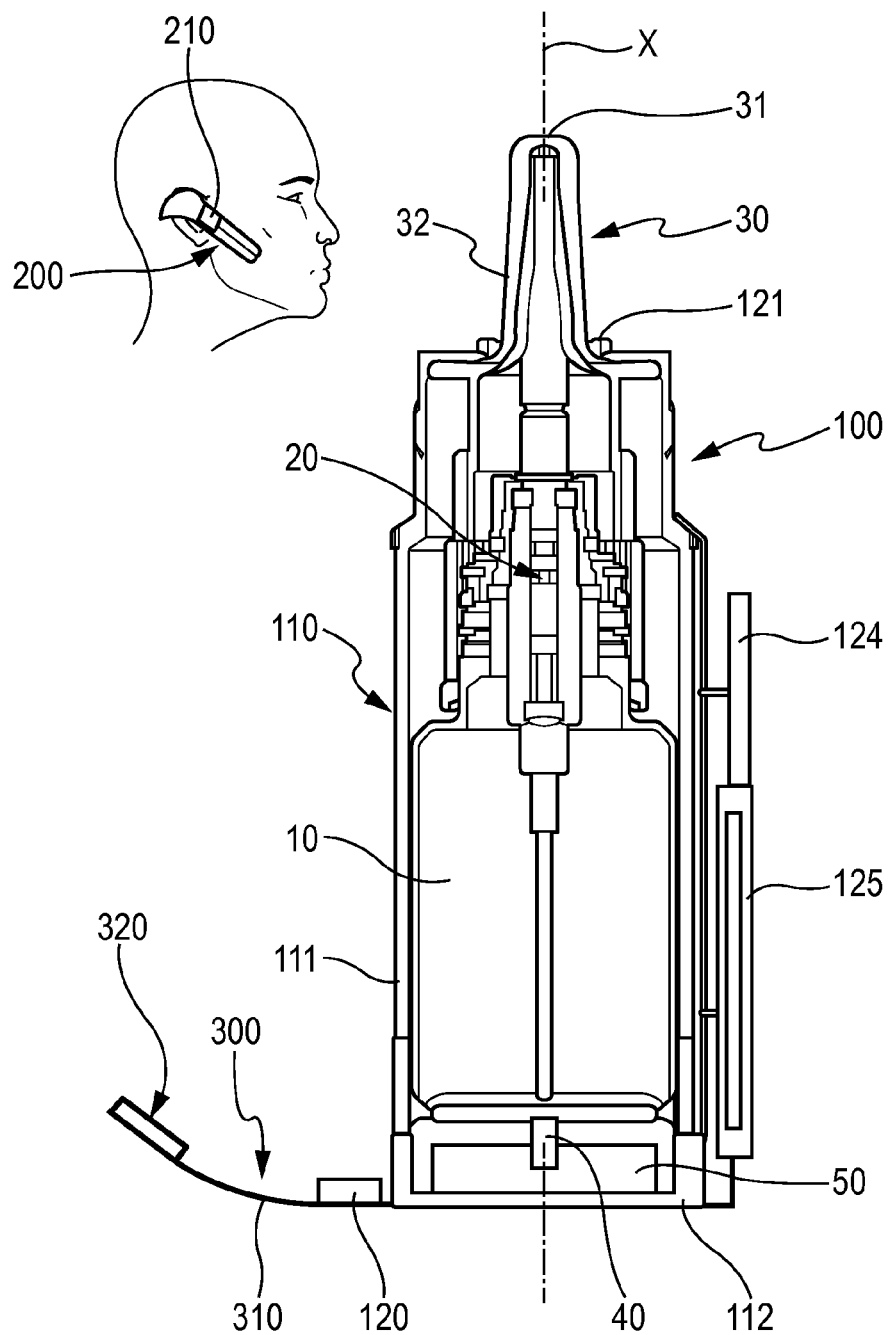

(52) U.S. Cl.
CPC . *A61M 2205/502* (2013.01); *A61M 2205/581* (2013.01); *A61M 2205/582* (2013.01); *A61M 2205/587* (2013.01); *A61M 2205/609* (2013.01)

(58) Field of Classification Search
CPC ...... A61M 2205/581; A61M 2205/582; A61M 2205/587; A61M 2205/609; A61M 16/161; A61M 2205/13; A61M 2205/215; A61M 2205/3313; A61M 2205/332; A61M 2205/3368; A61M 2205/3569; A61M 2205/3592; A61M 2205/43; A61M 2205/583; A61M 2205/8212; A61M 2209/088; A61M 2230/62
See application file for complete search history.

(56) References Cited

U.S. PATENT DOCUMENTS

2021/0369992 A1\* 12/2021 Norrant ................. A61M 15/08
2022/0218941 A1\* 7/2022 Vu .......................... G16H 50/20

OTHER PUBLICATIONS

International Search Report of PCT/FR2020/051281 dated Oct. 12, 2020 [PCT/ISA/210].

\* cited by examiner

ASSEMBLY FOR DISPENSING A FLUID PRODUCT

CROSS REFERENCE TO RELATED APPLICATIONS

This application is a National Stage of International Application No. PCT/FR2020/051281 filed on Jul. 16, 2020, claiming priority based on French Patent Application No. 1908249 filed on Jul. 19, 2019.

The present invention relates to an assembly for dispensing a fluid product, comprising a nasal device for dispensing a fluid product and a remote mobile device such as an earpiece.

Nasal dispensing devices are well known. They generally comprise a reservoir containing one or more doses of fluid products and a dispensing head for dispensing the fluid product, in particular via a pump, a metering valve, or a piston which slides in said reservoir. When the user wishes to use the device, the user inserts the dispensing head into the nostril and actuates the device so as to dispense a dose of fluid product, generally in the form of a spray.

A disadvantage with prior art devices concerns the effectiveness of the dose which is dispensed into the nostril, which often depends on the orientation of the device at the moment the dose is dispensed. As an example, when the dispensed fluid product is intended to act on the brain, only a tiny portion of the dose generally reaches the target zone for this type of treatment, namely the olfactory zone comprising the ethmoid sinuses, in particular because of the orientation of the administering device in the nostril, which varies from one patient to another. Unfortunately, it appears that this orientation determines whether targeting of the target zone is successful, in particular in the case of a closed spray which is used to obtain the maximum deposition into the target zone.

Document WO 98/57690 describes a device for dispensing nasally, comprising orientation means pressed onto the user's top lip. Although that improves the quality of insertion, such an orientation device does not make it possible to guarantee optimal orientation at the moment the dose is dispensed.

Documents WO 02/085282 and FR 3 024 655 describe other prior art devices.

The aim of the present invention is to provide a dispensing assembly which does not suffer from the aforementioned drawbacks.

In particular, the aim of the present invention is to provide a nasal dispensing assembly which makes it possible to control the orientation of the device in the nostril, irrespective of the morphology of the patient and irrespective of whether the patient is in a standing, lying or reclining position at the moment when the device is used.

Another aim of the present invention is to provide a nasal dispensing assembly which improves the amount of active fluid that is deposited on the olfactory zone and/or the ethmoid sinuses.

Another aim of the present invention is to provide a nasal dispensing assembly which makes it possible to inform the user in real time about the quality of insertion of the device into the nostril.

Another aim of the present invention is to provide a nasal dispensing assembly which enables the user to correct the orientation of the device in the nostril at the moment it is actuated.

Another object of the present invention is to provide a nasal dispensing assembly which is simple and inexpensive to manufacture and to assemble.

The present invention therefore provides a fluid product dispensing assembly comprising:
- a device for dispensing a fluid product nasally, said nasal device comprising a reservoir containing fluid product, a dispensing member for dispensing a dose of fluid product upon each actuation, and a dispensing head which is assembled on said dispensing means, said dispensing head being provided with a dispensing orifice,
- a remote mobile device such as an earpiece attached to the head of the user, in which:

said nasal device and said remote mobile device attached to the head of the user each comprise an orientation sensor such as an accelerometer or a gyroscope, said orientation sensors cooperating in order to determine the position of the nasal device in a user's nostril, said nasal device comprising an indicator which is visible to the user when the nasal device is inserted into said nostril in order to guide the user towards an optimal orientation of the nasal device in said nostril, and said nasal device comprises an electronic module and automatic actuation means adapted to automatically actuate said nasal device when said orientation sensors detect that said nasal device is disposed in an optimal position in said nostril.

Advantageously, said nasal device includes a body comprising an upper body disposed around said reservoir and said dispensing means, and a lower body disposed under said reservoir.

Advantageously, said lower body, which is preferably removable from said upper body, contains said automatic actuation means, in particular a pusher element and a motor, which are adapted, during actuation, to displace said reservoir axially upwards with respect to said dispensing head in order to actuate said dispensing member thereby.

Advantageously, said indicator comprises a luminous indicator head provided with a plurality of luminous indicators, such as light-emitting diodes, adapted to assist and guide the user in real time in order to improve the positioning of said nasal device.

Advantageously, said indicator is formed on an arm which is integral with said nasal device, in particular in an articulated manner.

Advantageously, said electronic module, such as a printed circuit, comprises a microprocessor containing software for processing information provided by said sensors.

Advantageously, said nasal device further comprises a wireless communication module, advantageously a Bluetooth® module, for communication with a remote mobile device such as a smartphone, a tablet or a computer.

Advantageously, said nasal device comprises a screen which is adapted to display information that can be seen by the user.

Advantageously, said nasal device comprises a loudspeaker and/or a vibrating element for providing an audible and/or tactile indication to guide the user when positioning the nasal device in said nostril.

Advantageously, said indicator comprises a camera.

Advantageously, said camera determines, by means of facial recognition, the spatial position of said nasal device with respect to the face, and thus with respect to said nostril.

Advantageously, said nasal device comprises a second sensor, such as a brightness sensor, an infrared sensor, a humidity sensor, a temperature sensor, in order to detect the insertion of said nasal device into said nostril and/or to detect the depth of insertion.

Advantageously, said reservoir contains several doses of fluid product, said dispensing member being a pump or a valve adapted to dispense one dose upon each actuation.

Figure 2A:
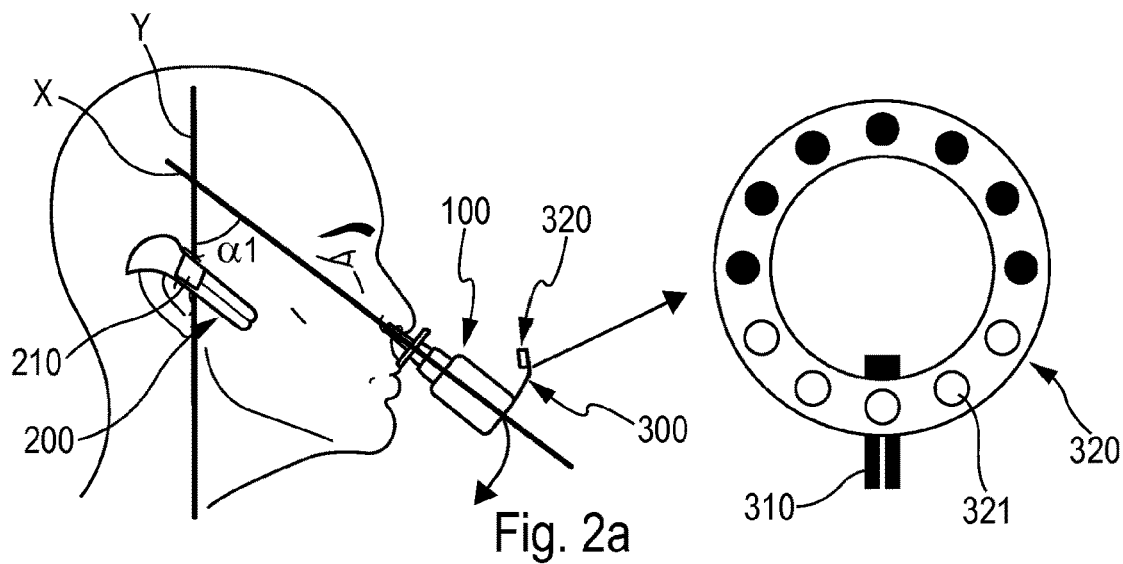
Figure 2B:
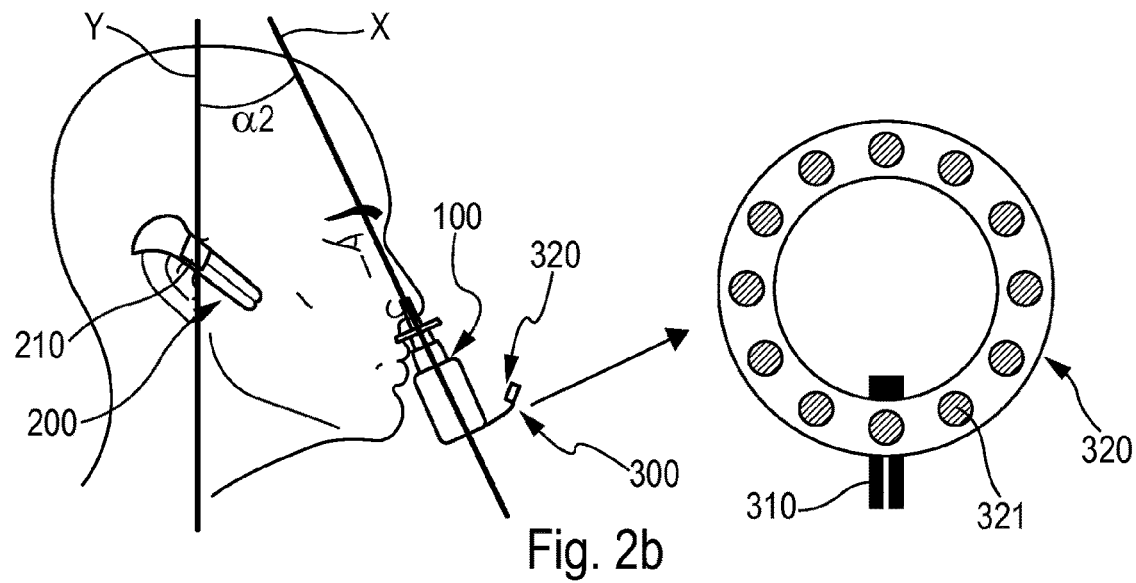
Figures 3A, 3B:
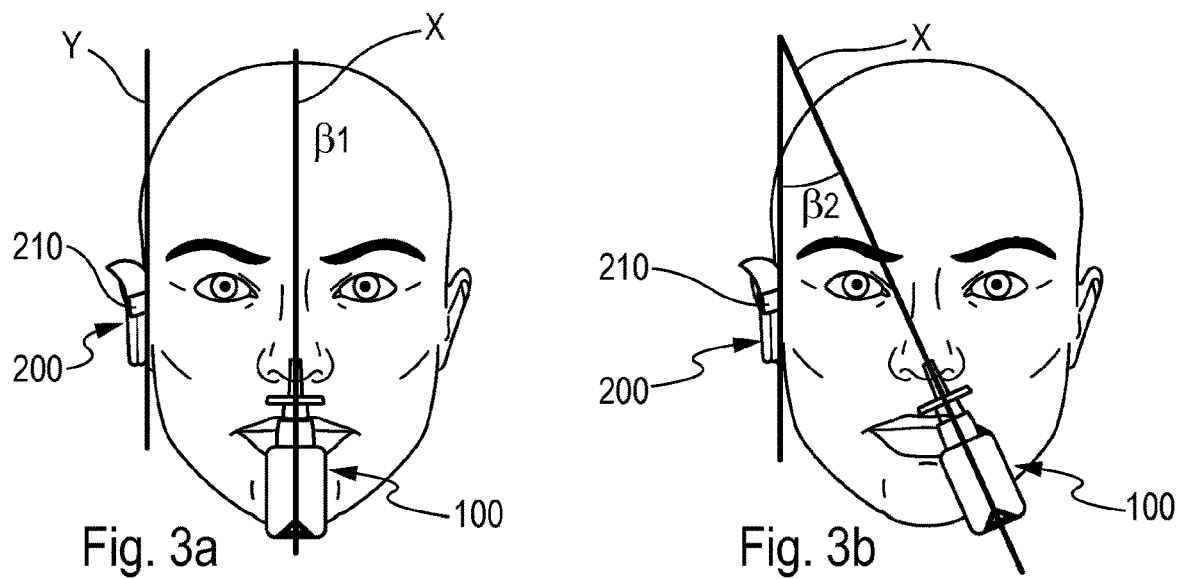
Figure 4:
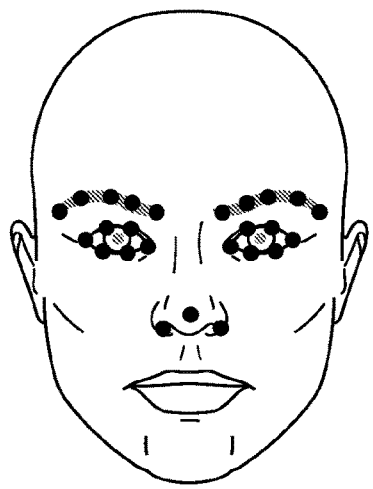
Figure 5:
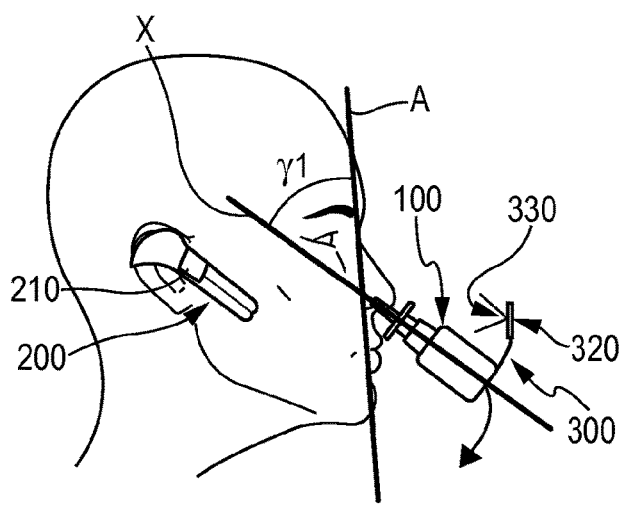
Figure 6:
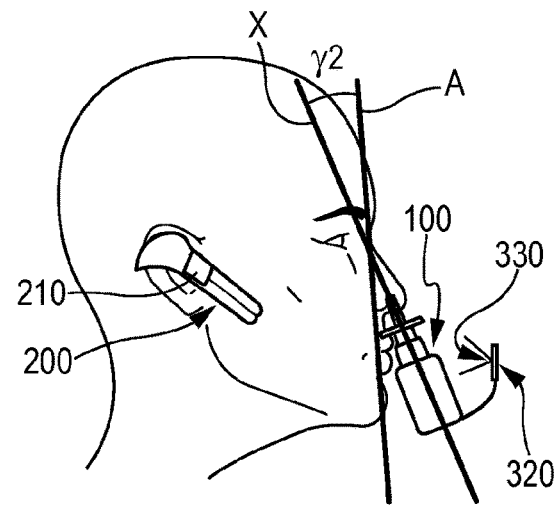
Figure 7:
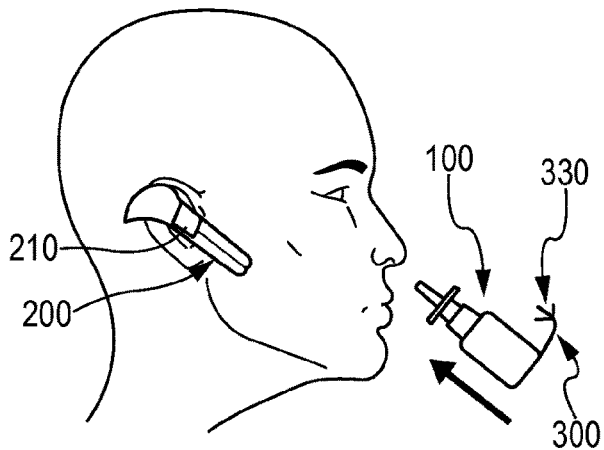
Figure 8:
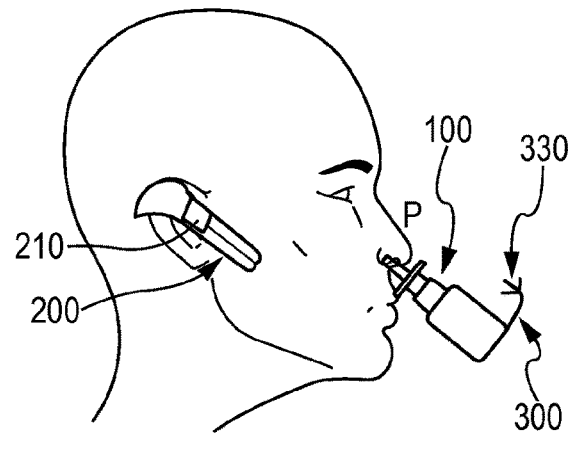
Figure 9:
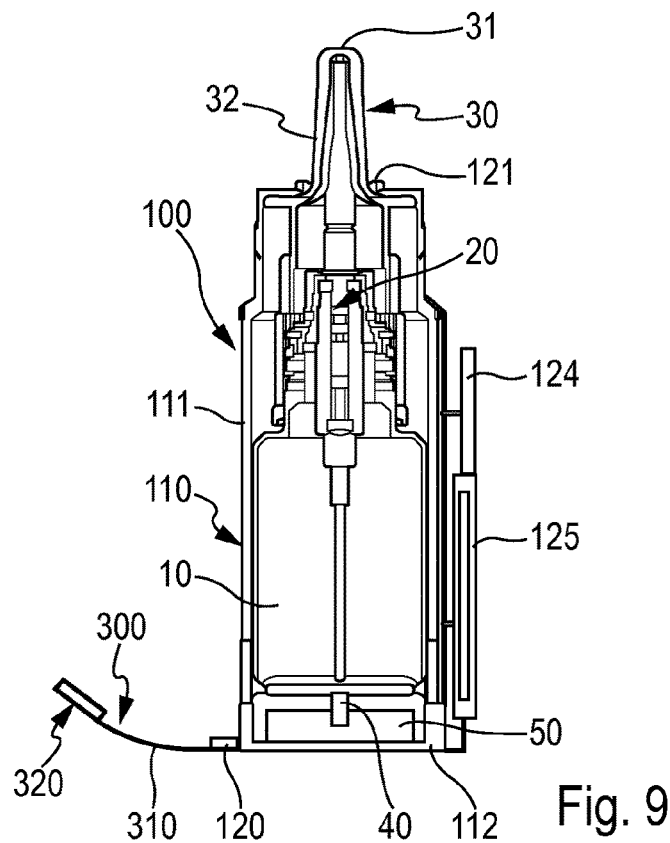
Figure 10:
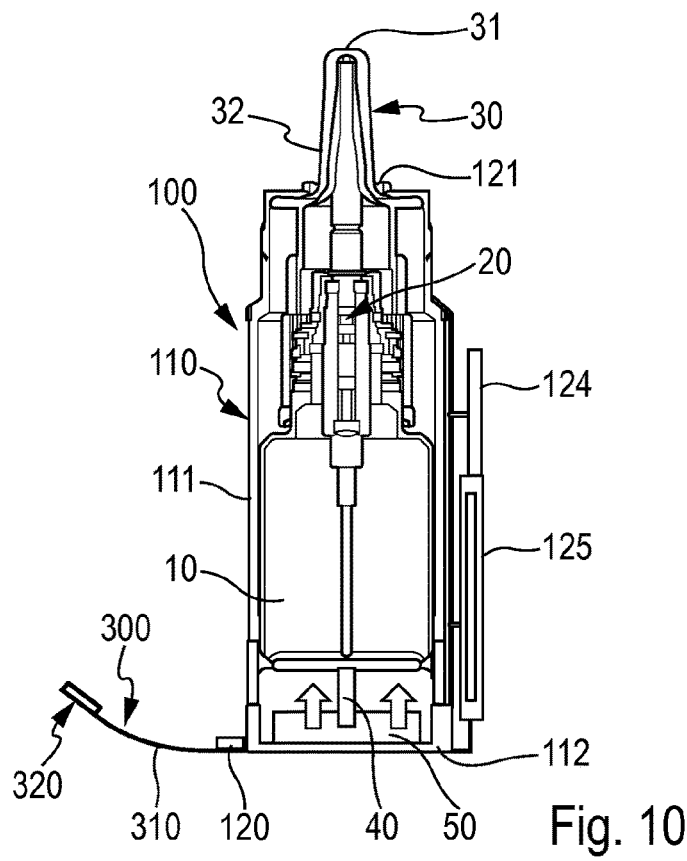

These and other characteristics and advantages will become more apparent from the following detailed description made with reference to the accompanying drawings given by way of non-limiting examples, and in which:

FIG. 1 is a diagrammatic view of a nasal dispensing assembly in accordance with an advantageous embodiment, FIGS. 2a and 2b are diagrammatic views of the dispensing assembly of FIG. 1 during use by the user, showing the visual indication of the device which informs the user in real time of the vertical orientation of the device in the nostril, FIGS. 3a and 3b are similar views to those of FIGS. 2a and 2b, showing the lateral orientation of the device in the nostril, FIG. 4 is a diagrammatic front view of a face, showing the reference points used by a camera in an advantageous embodiment, FIGS. 5 and 6 are diagrammatic views of a dispensing assembly in accordance with the advantageous embodiment with a camera, in use by the user, showing the vertical orientation of the device in the nostril, FIGS. 7 and 8 are diagrammatic views of the device of FIG. 1, in use by the user, showing the insertion of the nasal device into the nostril, and FIGS. 9 and 10 are diagrammatic views of the device of FIG. 1, respectively before and after actuation.

The present invention more particularly concerns a dispensing assembly with a multi-dose nasal device, i.e. comprising a reservoir containing several doses. However, it should be understood that the present invention is not limited to this type of device, but in contrast can be applied to any fluid product or powder dispensing device either of the single-dose type, i.e. comprising a reservoir which contains a single dose which is dispensed in a single actuation, of the two-dose type, i.e. comprising a reservoir which contains two doses which are dispensed in two successive actuations, or of the multi-dose type, i.e. comprising a reservoir which contains more than two doses.

In the description below, the terms "top", "bottom", "upwards", "downwards", "horizontal", and "vertical" refer to the upright position of the device shown in FIGS. 1, 9 and 10. The terms "axial" and "radial" refer to the longitudinal central axis X of the device, which is visible in FIGS. 1 to 3b, 5 and 6.

The nasal device 100 given by way of example is a multi-dose device which comprises a reservoir 10 containing a plurality of doses of fluid, liquid, or powdered product. A dispensing member 20, such as a pump or a valve, is assembled on the reservoir 10. A dispensing head 30 which comprises a dispensing orifice 31 is assembled on said dispensing member 20. The dispensing head 30 advantageously comprises a hollow sleeve 32, forming a nasal endpiece, extending axially upwards and terminating at said dispensing orifice 31.

Preferably, the device 100 comprises a body 110. This latter may comprise an upper body 111, disposed around the reservoir 10 and the dispensing member 20, and a lower body 112 disposed under said reservoir 10.

The device 100 comprises actuation means adapted to displace the reservoir 10 with respect to the dispensing head 30, so as to actuate the dispensing member 20 thereby.

In the example shown in the figures, the dispensing head 30 remains stationary with respect to the body 110, and it is the reservoir which is displaced axially upwards during actuation by the actuation means.

Advantageously, the device 100 is actuated by means of a pusher element 40 disposed in the lower body 112 and cooperating with the bottom of the reservoir 10 in order to displace said reservoir 10 axially upwards with respect to said dispensing head 30. A motor 50 is provided in order to actuate said pusher element 40 when the device is in the correct orientation in the nostril, as will be explained in greater detail below. Advantageously, the motor 50 comprises a battery which is rechargeable, for example by means of a socket adapted for this purpose. Advantageously, the lower body 112 is removable, in particular in order to simplify recharging the battery.

The nasal device 100 communicates with a remote mobile device 200, in particular an earpiece, attached to the patient's head, in particular via a wireless or hard wired communication, in order to assist and guide the user in real time to obtain an optimal orientation of the distribution device in the nostril at the moment of its actuation.

One aim is to ensure optimal positioning of the device at the exact moment that the device is actuated. This enables better deposition of medication into the nostril.

The user may optionally run a test beforehand at a health specialist's premises in order to determine the optimal angle for that user's own morphology, thereby enabling the user to configure the associated application. Optionally, it is possible to envisage using a scanner or a scan in order to determine the ideal angle accurately.

In accordance with the invention, the nasal device 100 comprises an orientation sensor 120 such as an accelerometer or a gyroscope, in order to determine the spatial orientation of the device in real time, in particular the angular position with respect to the remote mobile device 200.

The remote mobile device 200, which is attached to the user's head, also comprises an orientation sensor 210 such as an accelerometer or a gyroscope, enabling its position in space to be determined, in particular with respect to the user's head. Appropriate communication means are provided in order to enable the accelerometer 210 of the earpiece 200 to communicate with the accelerometer 120 of the nasal device 100.

Thus, the two orientation sensors 120 and 210 cooperate in order to accurately determine the position of the nasal device in the user's nostril. In particular, the accelerometer positioned on the nasal device 100 and the accelerometer of the earpiece can be used to obtain, in real time, a spatial position with the various angles in three dimensions of the nasal device with respect to the patient. More particularly, by comparing the angles between said orientation sensors 120 and 210, the vertical angle of inclination $\alpha$ (i.e. from top to bottom) and the lateral angle of inclination (i.e. to the left or to the right) between the axis X given by the orientation sensor 120 of the nasal device 100 and an axis Y given by the orientation sensor 210 of the earpiece 200 are measured. The orientation of said axis Y with respect to the user's nostril is always identical, irrespective of the position of the user. A measurement of the distance between the two orientation sensors 120 and 210 may also be used to determine the depth of insertion P of the nasal device 100 into the nostril.

Preferably, the nasal device 100 comprises a second sensor 121, such as a brightness sensor, an infrared sensor, a humidity sensor, a temperature sensor, to detect when the device 100 is inserted into a nostril. This second sensor 121 is not obligatory, but it is advantageous in identifying the moment when the nasal device 100 is actually inserted into the nostril. In this case, it could trigger the electronics to switch from a standby mode to an active mode. This second sensor 121 may be disposed at any appropriate location on the nasal device 100, for example at the top of the body 110, at the base of the sleeve 32 of the dispensing head 30, as can be seen in FIGS. 1, 9 and 10. In a variation, it could also be disposed on said sleeve 32, for example close to the dispensing orifice 31. As an example, an infrared sensor could be used to measure a round trip time for a signal. Thus, the deeper the nasal device is inserted into the nostril, the shorter is that time. This can thus improve the accuracy of the determination of the depth of insertion P.

The nasal device 100 further comprises an indicator 300 to guide the nasal device into an optimal position. This indicator 300 is preferably disposed on an arm 310 which makes it possible to offset the indicator laterally with respect to the nasal device in order to be visible to the user even when the nasal device has been inserted into the nostril. This arm 310 may, for example, be pivotally mounted on the lower body 112, as can be seen in the drawings. Clearly, other implementations are possible.

In the example of the drawings, the orientation sensor 120 of the nasal device 100 is disposed on said arm 310, but it could also be disposed at any other location on the nasal device 100.

The indicator 300 comprises a luminous indicator head 320 provided with a plurality of luminous indicators 321 such as light-emitting diodes (LEDs). Advantageously, these LEDs are disposed in a circle to form a ring of LEDs. These LEDs can be illuminated in different colours in order to indicate to the user how to change the position of the nasal device in the nostril. Other embodiments are possible, for example four luminous indicators in the form of arrows, orientated in the four cardinal directions.

In an advantageous variation, shown in FIGS. 4 to 8, the luminous indicator head 320 comprises a camera 330, preferably disposed at the centre of the luminous indicators 321. This camera 330 makes it possible to determine the spatial position of the nasal device 100 with respect to the face, and thus with respect to the nostril. The camera 330 thus makes it possible to apply reference points, in real time, in particular around the eyes, eyebrows and nose of the patient, as illustrated in FIG. 4, and to calculate the distances between these various reference points, making it possible to determine the position of the nasal device 100 with respect to the face and therefore the nostril of the patient. Typically, the camera 330 can identify several reference points, for example twenty-five, as illustrated in FIG. 4 which shows three reference points on the nose, six on each eye and five on each eyebrow. Other facial recognition methods may also be envisaged. The camera thus determines the angle α of the longitudinal axis X of the nasal device 100 with respect to an axis A of the face defined by said reference points. The orientation of said axis A with respect to the user's nostril is always identical, irrespective of the position of the user. This angle α determines the vertical inclination of the nasal device 100, i.e. upwards or downwards. The camera 330 also makes it possible to determine the lateral angle of inclination β, i.e. to the left or to the right, as well as the depth of insertion P.

The nasal device 100 also comprises an electronic module 125, such as a printed circuit or PCB, comprising a microprocessor containing the software for processing information provided by the sensor or sensors, the control means for the actuating motor 50 and optionally the camera (if provided). The electronic module 125 may also incorporate a function for locking the device for a predetermined time after each actuation, in particular if the fluid product contained in the reservoir 10 is a dangerous drug, of the fentanyl type. The electronic module may advantageously further comprise a communication module, preferably wireless, advantageously a Bluetooth® module, for communication with a second remote mobile device such as a computer, a smartphone or a tablet, for transmitting information, for example the date and time of the last dose taken, that for the next dose, the expiry date of the fluid product, etc. The communication module also makes it possible to monitor the use of the nasal device and, for example, to alert a third party in the event of non-use of the device within the required time.

Advantageously, the device 100 may comprise a screen 124, in particular a touchscreen, which is adapted to display information that can be seen by the user. It may also comprise a loudspeaker and/or a vibrating element to provide the user with an audible and/or tactile indication; this may be useful for the visually impaired, for example.

The operation of the assembly will now be described below with reference to the embodiment shown in figures. In this example, the remote mobile device 200 is an earpiece.

Irrespective of the position of the user, standing, lying down or sitting, the user places the earpiece 200 in their ear and deploys the indicator arm before inserting the nasal device 100 into a nostril.

In the advantageous variation of FIGS. 4 to 8, the camera 330 of the indicator 300 is also used, in order to improve positioning of the device in the nostril. FIG. 5 shows a non-optimal angle γ1, in this case about 60°, while FIG. 6 shows an optimal angle γ2, in this case about 30°.

Description of the operating steps:

Rest position: the accelerometer of the nasal device 100 does not indicate any movement; the electronics 125 of the device are on standby; the application indicates that the nasal device 100 is not in the patient's hand.

First pick-up position: the accelerometer 120 of the nasal device 100 detects the movement of the nasal device; the electronics 125 of the device are activated; in a variation, the optional second sensor 121 may be used to activate the electronics 125, as explained above, in which case this activation does not take place when the nasal device 100 is picked up, but during insertion thereof into a nostril.

Position of the device inserted into the nostril: the cooperation of the two orientation sensors 120 and 210 means that the position of the nasal device 100 in the nostril can be determined by comparing the angles between said orientation sensors; in the variation with the camera 330, the measurement by facial recognition of the vertical angle of inclination γ, of the lateral angle of inclination (not shown in the drawings) and the depth of insertion P further improves this determination of the position; if the positioning is outside the optimal zone, an indication, such as red coloured LEDs, is displayed on the indicator 300; the way the LEDs light up in the indicator ring will show the user which direction is wrong and as a result, the user will move the device to improve the position; at the same time, audible indications can be emitted such as, for example, "incline the device upwards/downwards" and/or "turn the device towards your left/right; similarly, vibrations of the nasal device could help the user to improve the positioning of the nasal device; when the user approaches the optimal orientation, a different indication, such as a different colour for the LEDs, could be displayed on the indicator 300 and/or the vibrations could be speeded up.

Optimal position: when the user has positioned the nasal device 100 in the optimal position, all of the LEDs are displayed in a different colour, for example in green; the vibrations could then be transformed into a continuous sound; in this optimal position, the electronics 125 automatically actuate the motor 50 which will push the pusher element 40 and therefore the reservoir 10 axially upwards in order to dispense a dose of fluid product; at the same time, an audible indication could be emitted such as "actuation of device in progress", for example; thus, before the optimal position is reached, the motor 50 is inactive, and when the optimal position is reached, the electronic module 125 switches on the motor 50 which initiates administration of the dose of fluid product.

After actuation, the screen 124 of the device 100, if one is provided, can display the date and time of the dose which has been administered, the number of doses remaining to be dispensed, the date and time of the next dose, an indication of locking of the device, possibly with a countdown. Other indications are also possible, in particular if the device 100 communicates with a remote device such as a computer, a tablet or a smartphone, in order to transmit information related to the use of the device.

The present invention thus provides numerous advantages:

- it promotes precise angular positioning at the moment a dose is dispensed, thereby ensuring optimal deposition of the fluid product which is dispensed into the nostril;
- it provides "real time" orientation assistance;
- it ensures automatic dispensing of the dose as soon as the optimal position is reached, thereby avoiding any risk of undesirable displacement due to the actuation gesture; the user only needs to hold the nasal device and look for the optimal position according to the indications of the indicator, the actuation of the dispensing member 20 being automatically managed by the orientation sensors 120, 210, the electronics 125 and the motor 50;
- it provides a solution which can be used with a large number of nasal dispensing devices of the same type, and is thus not limited to the example described;
- it has a minor impact on the design and bulk of the device, and as a result remains easy to carry;
- it does not have any impact on the operation and performance of the device, and thus does not modify the performance of the fluid product which is dispensed;
- it makes it possible to administer the fluid product easily to a third party;
- it can be used in any position, in particular standing, sitting, lying down;
- it makes it possible to transfer data to doctors, health specialists, pharmacists, regulatory authorities, insurers;
- it generates self-learning: finding an optimal angle will become easier and easier for the user, who will subconsciously memorise the correct positioning of the device with respect to the user's morphology.

Clearly, the present invention is not limited to the multi-dose device described above, but applies to any nasal device, whether it be a single-dose device, a two-dose device, or a multi-dose device.

The present invention is particularly intended for the treatment of any pathology which can be treated nasally requiring precise orientation of the nasal device such as, for example, Parkinson's disease or enuresis.

The present invention has been described above with reference to various embodiments, but naturally any useful modification could be applied thereto by the person skilled in the art without departing from the scope of the present invention as defined in the accompanying claims.

The invention claimed is:

1. A fluid product dispensing assembly comprising:
 a device for dispensing a fluid product nasally, said nasal device comprising a reservoir containing fluid product, a dispensing member for dispensing a dose of fluid product upon each actuation, and a dispensing head which is assembled on said dispensing member, said dispensing head being provided with a dispensing orifice,
 a remote mobile device, adapted to be attached to a head of the user, wherein:
 said nasal device and said remote mobile device adapted to be attached to the head of the user, each comprise an orientation sensor, said orientation sensors cooperating in order to determine the position of the nasal device in the user's nostril, said nasal device comprising an indicator which is visible to the user when the nasal device is inserted into a nostril in order to guide the user towards an optimal orientation of the nasal device in said nostril, and
 said nasal device comprises an electronic module and automatic actuation means adapted to automatically actuate said nasal device when said orientation sensors detect that said nasal device is disposed in an optimal position in said nostril.

2. The assembly as claimed in claim 1, in which said nasal device comprises a body comprising an upper body disposed around said reservoir and said dispensing member, and a lower body disposed under said reservoir.

3. The assembly as claimed in claim 2, in which said lower body contains said automatic actuation means which is adapted, during actuation, to displace said reservoir axially upwards with respect to said dispensing head in order to actuate said dispensing member thereby.

4. The assembly as claimed in claim 3, wherein said lower body is removable from said upper body.

5. The assembly as claimed in claim 3, wherein said automatic actuation means comprises a pusher element and a motor.

6. The assembly as claimed in claim 1, in which said indicator comprises a luminous indicator head provided with a plurality of luminous indicators, adapted to assist and guide the user in real time in order to improve the positioning of said nasal device.

7. The assembly as claimed in claim 6, wherein the plurality of luminous indicators comprise light-emitting diodes.

8. The assembly as claimed in claim 1, in which said indicator is formed on an arm which is integral with said nasal device.

9. The assembly as claimed in claim 8, wherein said arm is integral with said nasal device in an articulated manner.

10. The assembly as claimed in claim 1, in which said electronic module includes a microprocessor containing software for processing information provided by said sensors.

11. The assembly as claimed in claim 1, in which said nasal device further comprises a wireless communication module for communication with a second remote mobile device.

12. The assembly as claimed in claim 11, wherein said wireless communication module is a Bluetooth® module and wherein said second remote mobile device is a smartphone, a tablet or a computer.

13. The assembly as claimed in claim 1, in which said nasal device comprises a screen which is adapted to display information that can be seen by the user.

14. The assembly as claimed in claim 1, in which said nasal device comprises a loudspeaker and/or a vibrating element for providing an audible and/or tactile indication to guide the user when positioning the nasal device (100)-in said nostril.

15. The assembly as claimed in claim 1, in which said indicator (300) comprises a camera (330).

16. The assembly as claimed in claim 15, in which said camera determines, by means of facial recognition, the spatial positioning of said nasal device with respect to a face, and thus with respect to said nostril.

17. The assembly as claimed in claim 1, in which said nasal device comprises a second sensor in order to detect the insertion of said nasal device into said nostril and/or to detect the depth of insertion.

18. The assembly as claimed in claim 17, wherein said second sensor is a brightness sensor, an infrared sensor, a humidity sensor or a temperature sensor.

19. The assembly as claimed in claim 1, in which said reservoir (10)-contains several doses of fluid product, said dispensing member (20) being a pump or a valve adapted to dispense one dose upon each actuation.

20. The assembly as claimed in claim 1, wherein the remote mobile device is an earpiece.

21. The assembly as claimed in claim 1, wherein each orientation sensor is an accelerometer or a gyroscope.

* * * * *